Sept. 20, 1927.
M. H. MADSEN
1,643,078
HAY HANDLING APPARATUS
Filed Jan. 27, 1927
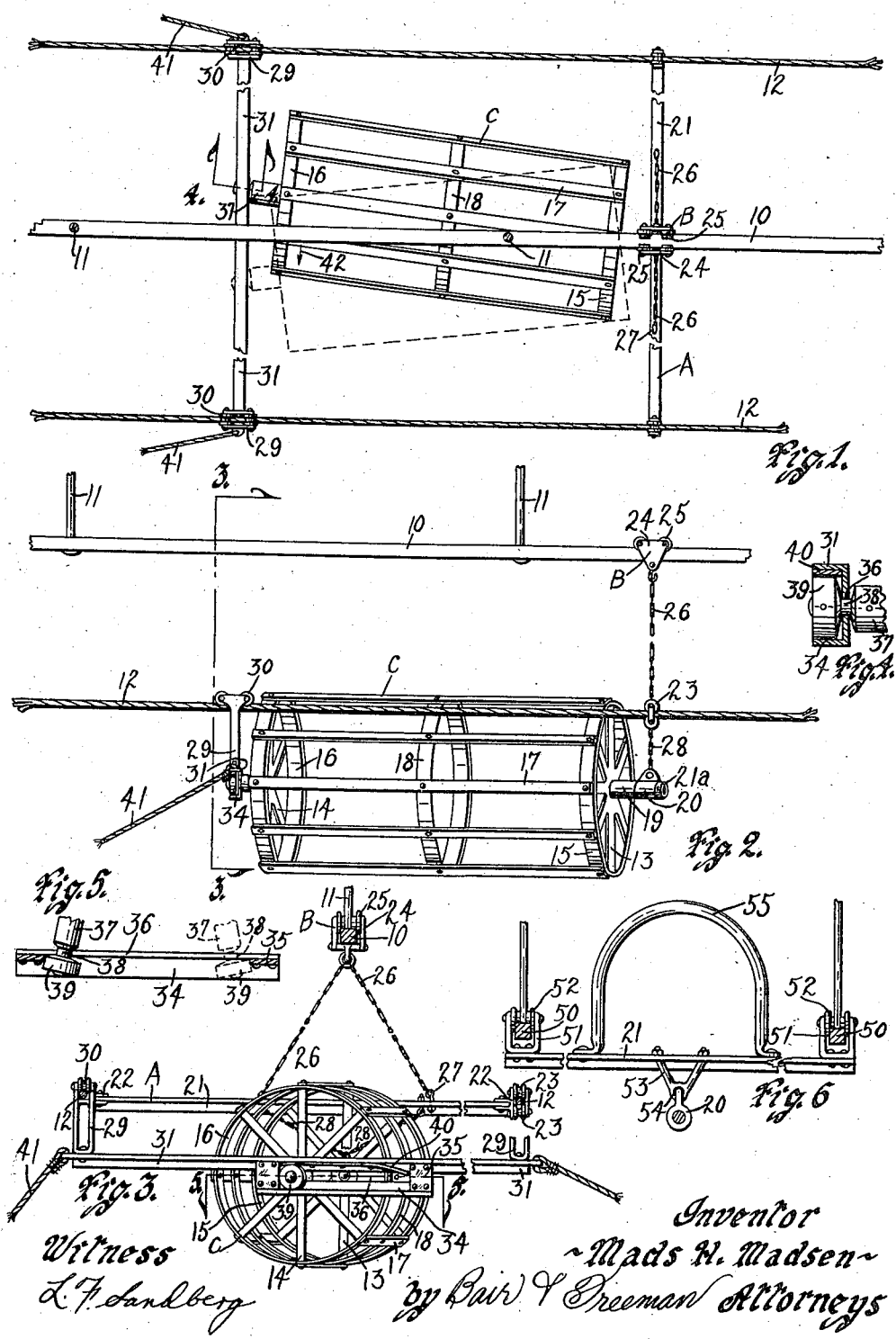

Patented Sept. 20, 1927.

1,643,078

UNITED STATES PATENT OFFICE.

MADS H. MADSEN, OF KIMBALLTON, IOWA.

HAY-HANDLING APPARATUS.

Application filed January 27, 1927. Serial No. 163,997.

My invention has to do with a hay handling device.

Where hay is stored in barns it is a common practice to put a track in the upper part of the barn. A fork travels along this track to carry the hay from outside this barn or from wagons to the desired point for depositing the hay.

One objectional feature of this method of carrying the hay into the mow or barn arises from the fact that the hay is dropped along a center line and has to be mowed back by hand.

The object of my invention is to provide mechanism of simple, durable and inexpensive construction which can be used in connection with the fork and which will serve the purpose of throwing the hay either to one side or to the other so as to reduce labor of mowing it away.

For this purpose it is my object to provide a rotating member arranged below the track so that it may be adjusted to be below the fork when the hay is discharged, whereby the hay will drop on the rotating member and be dropped on one side or the other of the center line of the barn or the line immediately below the track.

With these and other objects in view, my invention consists in the construction, arrangement and combination of the various parts of my hay handling apparatus, whereby the objects contemplated are attained, as hereinafter more fully set forth, pointed out in my claims, and illustrated in the accompanying drawings, in which:

Figure 1 is a top or plan view of a track and a hay handling device embodying my invention, the hay track hangers being shown in section.

Figure 2 is a side elevation of this same.

Figure 3 is a detail sectional view taken on the line 3—3 of Figure 2.

Figure 4 is a sectional view taken on the line 4—4 of Figure 1.

Figure 5 is a detail sectional view taken on the line 5—5 of Figure 3; and

Figure 6 is a transverse sectional view illustrating a modified form of a mounting for my device.

I have not illustrated in my drawings the barn in which my device is installed. I have shown in my drawings the track indicated generally by the reference numeral 10 which may be in any suitable shape or form for accomplishing my purpose and which is supported by vertical hangers 11.

It will be understood that the fork carriage travels on the track 10 in the usual way. My improved hay handling device is partially supported from the track 10 and partially supported from a pair of cables 12 stretched below the track and on opposite sides thereof.

My improved device for dumping the hay to one side or the other when it is discharged from the fork comprises a skeleton drum or the like comprising the two end spiders 13 and 14 having the peripheral rims 15 and 16. These rims are connected by circumferentially-spaced slats 17 which may be braced by a ring 18 between the end members and as illustrated, substantially midway of the length of the rotary member.

Projecting from the spider 13 is a spindle 19 on which is loosely mounted a sleeve 20 beyond which is a retaining collar 21$^a$. Mounted above the spindle 19 between the two cables 12 is a transversely arranged carriage indicated generally at A.

The carriage comprises an angle bar 21 provided at its ends with suitable brackets 22 carrying grooved wheels or rollers 23. The rollers 23 of each bracket 22 receives between them, one of the cables 12 as illustrated in Figures 2 and 3 whereby the carriage A is mounted to travel on the cables 12.

Above the carriage A, a track carriage B is mounted to travel on the track 10. The carriage B may be comprised of a U-shaped bracket 24 carrying on the upper part of its arm the wheel 25 which travels on the track. Secured to the carriage B are chains or the like 26 extended downwardly and diverging and secured at their lower ends as at 27 to the angle bar member 21 of the carriage A.

A pair of chains 28 are secured to the sleeve 20 hereinbefore mentioned and diverging upwardly and secured at their upper ends to the carriage A.

The structure just explained serves several functions. The chains 26 and carriage A serve to prevent the cables 12 from sagging in the middle.

The structure just described is also such as to prevent the end of the rotating member which is supported from the carriage A, from swinging laterally. Both of the carriages B and A may travel freely lengthwise of the track 10 and cables 12.

I will now describe the means for supporting the other end of the rotary member. I provide a pair of hangers 29 which are practically U-shaped as shown at the left hand part of Figure 3 and which support at their upper ends the grooved wheels 30 traveling on the cables 12.

There is one of the hangers 29 for each of the cables 12 and these hangers are connected by an angle bar 31 as shown in Figure 3. A shorter hanger bar 34 is spaced below the angle bar 31 as shown in Figure 3 and is connected therewith by plates 35.

The angle bars 31 and 34 are arranged as shown in Figures 2 and 3 to form channels opened away from the end spider 14 of the rotary member which channel is provided with a central slot 36.

Extending from the spider 14 is a hub 37 having the projecting spindle 38 extended through the slot 36 and carrying between the horizontal flanges of the angles 31 and 34, a roller 39.

The parts are so arranged that the spindle 38 and roller 39 are fixed to the rotary member which for convenience I indicate generally by the character C so as to rotate with it.

It will thus be seen that the rotary member C at its left hand end as shown in Figure 2, has a certain degree of prelateral movement. When the roller 39 travels between the angles 31 and 34 for the possible distances between the plates 35, I have provided on the underside of the horizontal flange of the angle 31, a spring 40 the ends of which are declined downwardly slightly, so as to frictionally engage the roller 39 and to hold it against movement when it is near the limits of its lateral movement as determined by the plates 35.

A rope or the like 41 is secured to each end of the angle 31 for providing means for sliding the rotary device in one direction. It may be slid in the other direction by the engagement of the fork carriage with the carriage B.

In the actual use of the device the fork with its hay load is drawn to position above the rotary device C and the load of hay is discharged, and drops on the rotary member. Assuming that the rotary member is in the position shown in Figure 1, the center of the load will be such as to cause the hay to rotate in the direction indicated by the arrow 42 in Figure 1.

The hay will then be discharged on one side of the center line of the track and the rotation of the member C will cause its left hand end to travel so that the rotary member will move from its full line position in Figure 1 to its dotted line position in Figure 1.

The next load will obviously cause the rotary member to move from its dotted line position to its full line position and the load of hay will be discharged on the other side of the center line.

It will be obvious therefore, that the rotary device serves automatically to discharge the load alternately on the opposite sides of the center line.

In Figure 6 I have shown a slightly modified form of means for mounting the right hand end of the rotary device. In the form shown in Figure 6 I have shown 2 tracks 50 similar to the track 10 to replace the cables 12 and have shown the angle bar 21 provided with two brackets 51 at its opposite ends.

The brackets 51 support the flanged wheels 52 traveling on the tracks 50. A U-shaped hanger 53 extends downwardly from the angle 21 and is connected by universal joints 54 with the sleeve 20. The wheels 30 of the hangers 29 also travel on the tracks 50 in the type of hay handling device illustrated in Figure 6. A guard 55 made of pipe or the like in U-shaped form is secured to the bar 21 to prevent hay from traveling past the end skeleton drum C. It will thus be seen that I have provided a simple and effective means for causing the hay to be discharged on opposite sides of the center line of the barn or the like.

The rotary member can be moved to any position longitudinally of the track and will alternately dump the hay on opposite sides.

I found it desirable in building a device of this kind to so mount the end of the rotary member C which has spindles 19, as to prevent its lateral swinging movement when the hay is dropped on it. This is accomplished by the structures shown in my drawing.

I claim as my invention:

1. In a device of the class described, a rotary member, means for holding said rotary member for longitudinal sliding movement, said means being arranged to prevent lateral swinging of one end of the rotary member and to permit lateral swinging of the other end of the rotary member and means for affecting lateral swinging of one end of the rotary member.

2. In a device of the class described, a rotary member having spindles at its ends, means for rotatably mounting one spindle for sliding movement substantially longitudinally of the rotary member, said means being adapted to prevent the lateral swinging of the rotary member, means for mounting the other end of the rotary member for corresponding longitudinal movement of the member and for lateral movement of such other end, and means for affecting lateral movement of such other end.

3. In a device of the class described, a rotary member having spindles at its ends, means for rotatably mounting one spindle for sliding movement substantially longitudinally of the rotary member, said means being adapted to prevent the lateral swinging of the rotary member, means for mounting the other end of the rotary member for corresponding longitudinal movement of the member, said means including parts for permitting such other end of the rotary member to slide laterally, means for holding said other member at the opposite ends of its sliding movement, and means for affecting lateral sliding movement of such other end of the rotary member.

4. In a structure of the class described, a rotary member having spindles at its ends, a guide frame arranged laterally with relation to the rotary member from one end thereof, means for mounting the guide frame for movement with the rotary member longitudinally thereof, a roller on one spindle mounted on said guide frame for limited lateral rotary movement, the roller being fixed to the spindle and means for supporting the other end of the rotary member rotatably and for permitting the rotary member to be adjusted longitudinally.

5. In a device of the class described, a rotary member, means for supporting one end of the rotary member against lateral movement and for permitting the bodily movement of the rotary member substantially longitudinally and for permitting its rotation, a hanger structure adapted to move with said rotary member in its longitudinal movement having a laterally extended guide frame, a roller fixed to said rotary member arranged to travel in said guide frame.

Des Moines, Iowa, November 19, 1926.

MADS H. MADSEN.